United States Patent

[11] 3,627,438

| [72] | Inventors | Vernon Muslin<br>16 Roxburgh Croft, New Cubbington, Leamington Spa;<br>Derrick Crossland, Western Road, Stratford-on-Avon, both of England |
|---|---|---|
| [21] | Appl. No. | 854,077 |
| [22] | Filed | Aug. 29, 1969 |
| [45] | Patented | Dec. 14, 1971 |
| [32] | Priority | Aug. 29, 1968 |
| [33] | | Great Britain |
| [31] | | 41,195/68 |

[54] MACHINE TOOL GUARDS
9 Claims, 4 Drawing Figs.

[52] U.S. Cl. .................................................. 408/72,
144/251 A, 408/92, 408/110
[51] Int. Cl. ..................................................... B23b 47/00
[50] Field of Search ........................................... 77/55 R;
144/251 A; 51/268

[56] References Cited
FOREIGN PATENTS
1,187,915  3/1959  France ........................  77/55

1,069,835  5/1967  Great Britain ................  77/55

*Primary Examiner*—Francis S. Husar
*Attorney*—Kenway, Jenny & Hildreth

ABSTRACT: A machine tool guard to guard an operative or other persons from injury by moving parts of the machine tool includes a support arrangement adapted to be mounted on a part of a machine tool which is reciprocable with advance of the tool towards a workpiece, thereby providing a compact guard closely surrounding the tool. The guard incorporates a plurality of elongated guard members each extending from said support arrangement in the direction of advance of the machine tool to form a guard therefor, the elongated guard members each being mounted for independent reciprocation with respect to said support arrangement such that in operation they are at least partially retractable into and extensible from said support arrangement. As a result the individual guard members can be made sufficiently long to effectively guard the tool while at the same time they can be retracted to permit a desired extent of advance of the tool towards or into the workpiece.

3,627,438

MACHINE TOOL GUARDS

The invention relates to machine tool guards.

There are many machine tools, such as for example vertical drilling machines in which a part of a machine tool, in the case of a drilling machine it is a quill, reciprocates towards and away from the workpiece with advance and retraction of the drill or other tool. There is thus a basic problem in providing a tool guard for varying space between the quill or corresponding part of the machine tool and the workpiece or work holder within which the workpiece is mounted.

One partial solution to this basic problem is disclosed in British Pat. specification 1,069,836. In this arrangement, a guard is formed by a support frame which is mounted on the quill and by a series of rods which are slidable within the support frame form a position where they extend to below the support frame and surround the drill to a position where they extend upwardly from the support frame but do not project substantially below the support frame. With this arrangement, when the drill and quill are lowered to a workpiece any rods which come into contact with the workpiece or a work holder no longer continue to be lowered with advance of the drill but instead move upwardly with respect to the guard frame to a position where they project substantially above the guard frame.

A major disadvantage of this arrangement is that in situations where there is only a small clearance above the guard frame, the rods are prevented from rising up with respect to the guard frame when they come into contact with some other parts of the machine tool.

According to the present invention there is provided a machine tool guard including a support arrangement adapted to be mounted on a part of a machine tool which is reciprocable with advance of the tool towards a workpiece, a plurality of elongated guard members each extending from said support arrangement in the direction of advance and together at least partially surrounding the tool to form a guard therefor, the elongated guard members each being mounted for independent reciprocation with respect to said support arrangement such that in operation they are at least partially retractable into and extendable from said support arrangement.

Preferably the support arrangement comprises a plurality of guide members within each of which a respective guard member is retractable and preferably these guide members are tubular guide members.

Preferably the guard members are resiliently urged towards an extended position and are retractable against the resilient force.

Due to the fact that the guard members are retractable into the support arrangement, so that they do not in the retracted position project above the support arrangement, the guard may be used in situations where there is little or no clearance above the support arrangement.

Preferably the support arrangement is formed in two parts which are pivotally interconnected in order to enable part of the guard to be swung away from its guarding position around the tool to permit access to the tool. The two parts of the support arrangement which are pivotal with respect to each other may be geared together so that pivotal movement of one part results in corresponding pivotal movement in the opposite direction of the other part. The two parts may be closable together by means of a catch which is such that the two parts can be released from each other and moved apart in a single operation.

An embodiment of the invention will now be described by way of example only with reference to the accompanying drawings in which.

Figure 1:
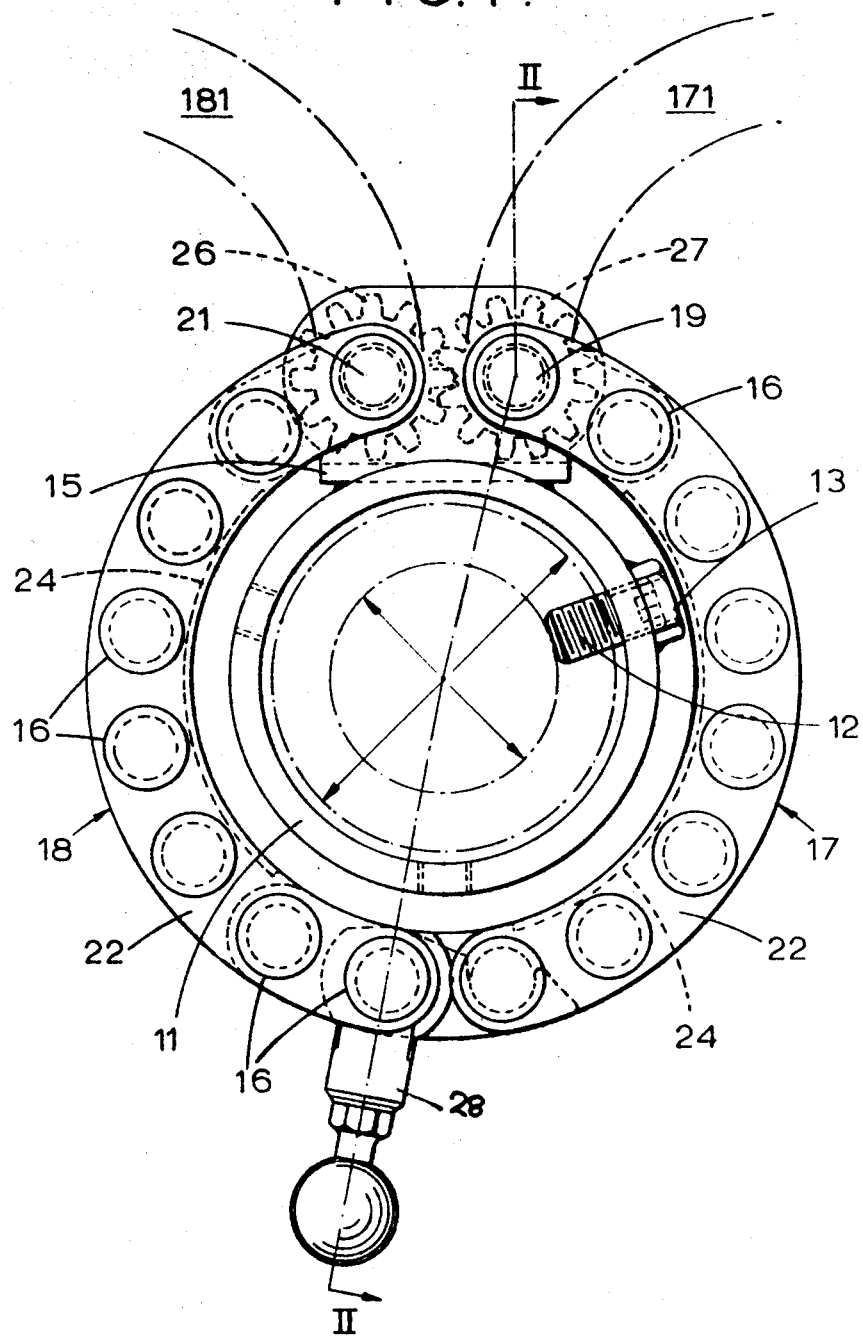
FIG. 1 is a plan view partly in section of a machine tool guard in accordance with the invention.

The guard incorporates a mounting section constituted by a ring 11 which in use is positioned to surround the quill of a drilling machine or the corresponding part of some other machine tool. A typical quill is represented in chain-dotted outline in FIG. 1. The ring 11 is secured to the quill by means of a series of grub screws 12 which are threaded in nuts 13 which are in turn welded to the ring 11. Also welded to the ring 11 and forming part of the mounting section is a pivot bracket 15.

A support arrangement for a series of elongated guard members 16 (FIGS. 1 and 3) is constituted by two arcuate sections 17 and 18 each of which is pivoted to the pivot bracket 15 by a pivot 19 or 21 respectively. These pivots are conveniently additional elongated guard members. Each arcuate section such as 17 of the mounting section is constituted by an upper arcuate plate 22 and a corresponding lower arcuate plate 23, and two arcuate plates being joined together by a curved spacer plate 24. The upper arcuate plates such as 22 of the arcuate sections 17 and 18 each carry a respective gear wheel sector 26 and 27, the teeth of which are interengaged with each other.

The effect of these gear teeth is to interconnect the two arcuate sections 17 and 18 for pivotal movement together so that if one section such as 18 is moved to the position indicated at 181 the other section automatically moves to a corresponding position such as 171.

Figure 2:
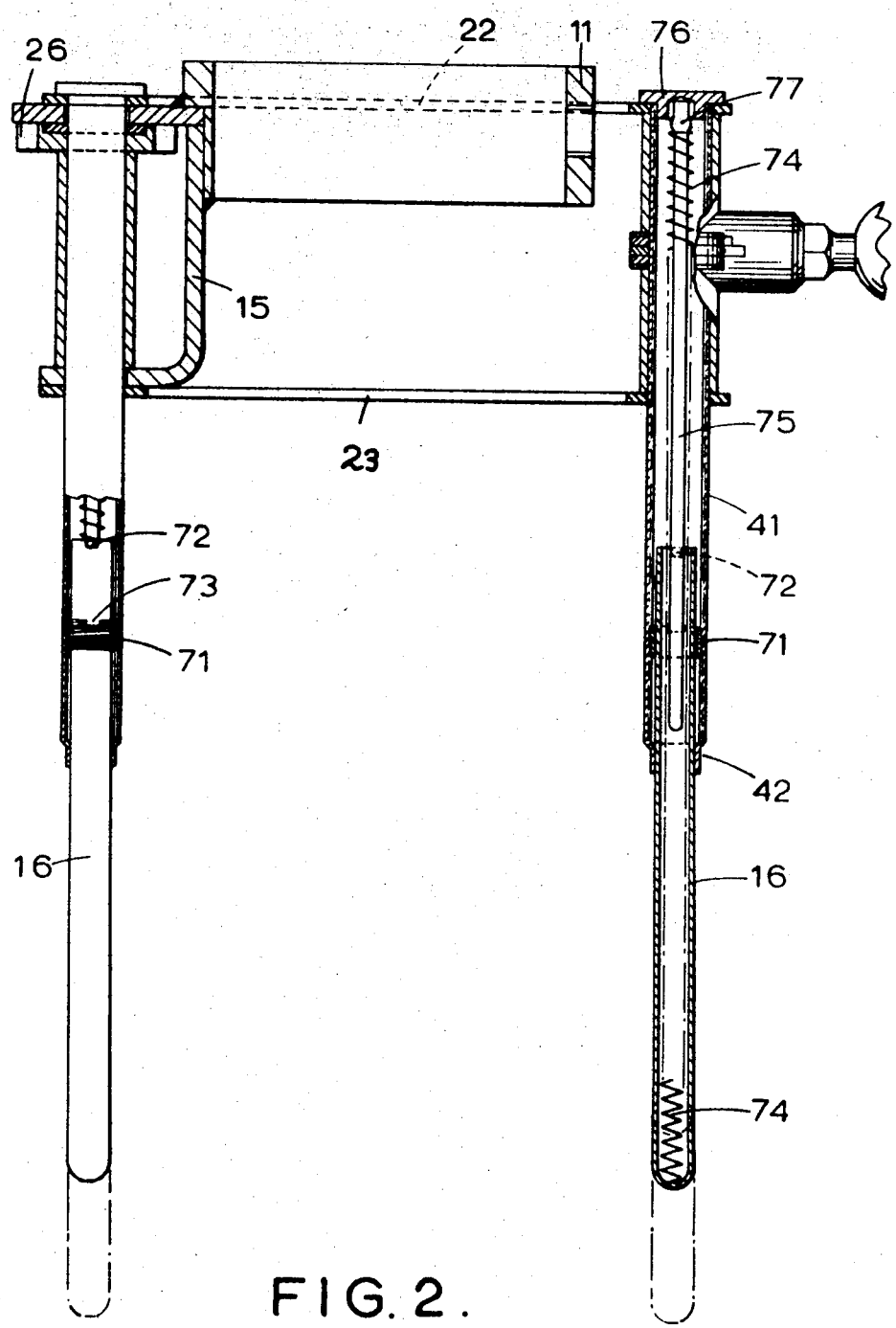
FIG. 2 is a section on the line II—II of FIG. 1.

The upper and lower plates such as 22 and 23 of each arcuate section are provided with a series of circular holes. Each hole in an upper arcuate strip 22 is aligned with a corresponding hole in the lower arcuate strip 23 and these holes are employed for the reception of an assembly which will hereinafter be referred to as a telescope assembly. FIG. 2 shows a telescope assembly in section. The telescope section incorporates an internally threaded tubular sleeve 41 which has a smaller diameter portion 42 at its lower end. A guard member 16, in the form of a tube of smaller diameter is slidable within the sleeve 41. The internal thread of the sleeve 41 carries an externally threaded bushing 71 which has a very thin wall thickness. The guard member 16 is a sliding fit within the interior of this bushing and thus the sliding action of the guard member 16 is guided by the smaller diameter portion 42 and by the interior of the bushing 71. The position of the externally threaded bushing 71 up and down the interior of the sleeve 41 is adjustable by rotation of this bushing. This rotation may be effected by rotation of the guard member 16 and engagement of a pair of lugs 72 near the upper end of the guard member 16 in corresponding slots 73 in the bushing 71.

A coil spring 74 extends from the lower end of the guard member 16 to the upper end of the sleeve 41. A rod 75 guides the spring 74 and prevents it from jamming against the threaded interior of the tube 41. The rod 75 is secured in an end nut 76 at the upper end of the sleeve and a pinched portion 77 near the top of the rod 75 forms the upper abutment for the spring 74. The spring 74 thus holds the guide member 16 in a position where it projects out from the sleeve 41 to an extent determined by the position of the externally threaded bushing 71. If the bushing is screwed up to near the top of the sleeve 41 then the engagement between the bushing and the guard member 16 prevents the guard member from extending through a substantial distance beyond the sleeve 41. On the other hand when the bushing 71 is near the lower end of the sleeve 41 the guard member 16 can project through a substantial distance beyond the bottom of the sleeve 41. Thus the lowermost position of the guide member 16 is adjustable and the reason for this will be described below.

The sleeve 41 is secured in the arcuate section 17 or 18 by means of the end nut 76 as shown in FIG. 2.

Due to the fact that each of the telescope assemblies is secured in position in the appropriate arcuate section 17 or 18 by means of a single nut it is a simple matter to replace one telescope assembly with a corresponding assembly if this is required during service. In addition, when adapting the guard for use with different lengths of drill or other tool, telescope assemblies with guard members of various lengths may be substituted for the guard members shown in the drawing.

A catch arrangement 28 is provided to secure the two arcuate sections 17 and 18 together in the position shown in full or to allow them to be moved at will to the position 171 and 181 to give access to the drill or other tool. The catch member should be such that in a single operation it is possible to disengage the two arcuate sections one from the other and then swing these sections apart to positions 181 and 171.

Figure 3:
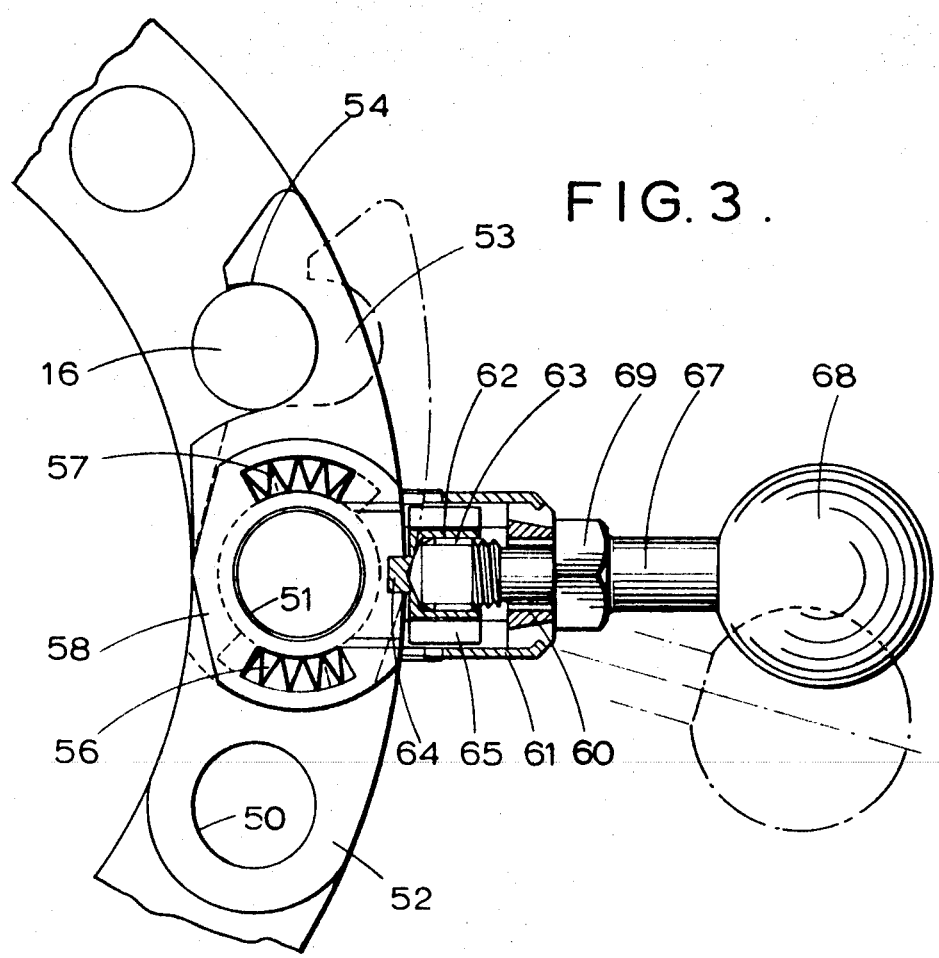
FIG. 3 is an enlarged view of part of FIG. 1.
Figure 4:
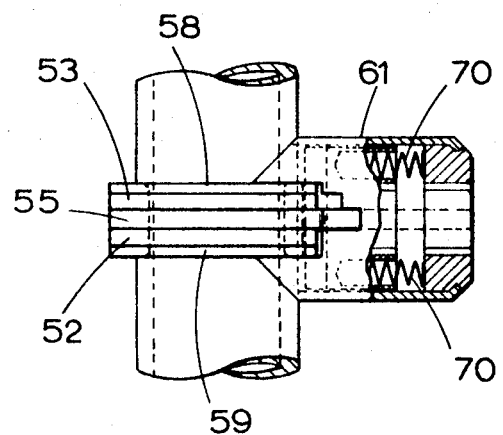
FIG. 4 is a side elevation of the detail shown in FIG. 3.

Such a catch is shown in FIGS. 1 and 2 and in more detail in FIGS. 3 and 4. The catch comprises a sleeve 51 which, when the catch is installed, surrounds one of the sleeves 41. A first arcuate catchplate 52 surrounds the sleeve 51 and also has an aperture 50 which in use surrounds the adjacent sleeve 41. A second arcuate catchplate 53 extends in the opposite direction towards another sleeve 41 at the extremity of the opposite arcuate section of the guard and when the guard is closed a hook portion 54 of this catchplate engages with the relevant sleeve 41. A baseplate 55 is arranged between the two catchplates 52 and 53 as shown in FIG. 4. Two arcuate slots in the baseplate and one corresponding arcuate slot in each of the two catchplates receive small coil springs 56 and 57. These springs tend to urge the outer ends of the catchplates 52 and 53 to the left as shown in FIG. 3, thus tending to rotate the baseplate 55 anticlockwise and to hold hook portion 54 in engagement with the relevant sleeve 41. Upper and lower spring cover plates 58 and 59 hold the springs 56 and 57 in their respective slots.

The baseplate 55 is secured rigidly to a boss 61 which is in the form of a hollow sleeve. The sleeve carries a plunger 62 which has a rearwardly directed screw-threaded opening 63 and at its forward end has a transverse locking bar 64. The plunger 62 is held against rotation by a pair of slots 65. The plunger 62 may be advanced towards the left in FIG. 3 or retracted towards the right in FIG. 3 as will be described hereinafter. When the plunger is in its advanced position the locking bar 64 engages in corresponding notches in the catchplates 52 and 53 and thereby locks them in the position shown in full in the drawing. On the other hand, when the plunger 62 is retracted the catchplates 52 and 53 are free to rotate through an angle against the resilient force of springs 56 and 57. A pair of compression springs 70 normally hold the plunger 62 in its extended position.

A key shaft 67 (shown only in FIG. 3) is threaded at its inner end for engagement in the threaded opening of the plunger 62. The outer end of the key shaft 67 is provided with a knob 68 which serves as a handle. The key shaft 67 also incorporates a shoulder 69 which engages against the outer end of the sleeve 61 to restrict movement of the key shaft into this sleeve. The opening at the outer end of the sleeve 61 is also screw threaded at 60 so that it is necessary to screw the key shaft 67 in and out; this tends to prevent the key shaft from inadvertently falling out of the sleeve 61.

In use the key shaft 67 is screwed into the sleeve 61 to such an extent that its outer threaded portion extends completely beyond the threaded portion 60. At this stage the threaded portion of the sleeve 67 can be engaged in the threaded portion of the plunger 62. As the key shaft is screwed into the plunger 62 the shoulder 69 comes into engagement with the end surface of the plunger and thus further screwing motion tends to retract the plunger 62 thereby pulling its locking bar 64 out of engagement with the notches in the catchplates 52 and 53. This enables these catchplates to be pivoted which in turn permits the hook 54 to disengage its sleeve 41 and thereby to permit the two arcuate sections 17 and 18 of the guard to be moved apart. The appropriate pivotal movement can be achieved by movement of the knob 68 to the position shown in dotted outline in FIG. 3. This pivots the baseplate 55 and the catchplate 53 together due to the resilient interconnection of these two parts and this movement is permitted due to the fact that the plunger 62 has become disengaged from the catchplate 52. If this arcuate movement of the catchplate 53 is insufficient to clear the appropriate sleeve 41 then the sleeve 41 can deflect the catchplate 53 by pivoting it with respect to the sleeve 61 and baseplate 55 due to pressure of the sleeve 41 on the hook portion 54. Thus the two arcuate sections 17 and 18 are free to be swung apart. Due to the geared relationship between these two arcuate sections the only action which is required by an operative is to move the knob 68 in a downward direction (as shown in FIG. 3) and then to continue to move this knob until the two arcuate sections have moved apart to the desired extent. With the key shaft engaged in the plunger 62 as described above the guard may be latched and unlatched as desired.

On the other hand, if the key shaft 67 is disengaged from the plunger 62 or is removed entirely from the guard then there is no means for retracting the plunger 62 and the guard is locked in its closed position. Such a situation may be desirable where a machine tool such as a drill is being operated by unskilled labor. In these circumstances the skilled fitter who is responsible for maintaining the drill would retain the key shaft and thus have access to the drill. On the other hand the unskilled operative would be permanently guarded by virtue of the fact that he or she could not open the guard.

In use, the complete machine tool guard is mounted on the quill of a machine tool such as a drill by means of the mounting section described above. The length of guard member 16 should be so adjusted or selected that with the quill raised, the series of guard members surrounding the tool extend down below the tool and thus form an effective guard. At the same time the guard members should not be so long that they interfere with access to a workpiece. When the tool is lowered to a workpiece all of the guard members 16 are lowered with the quill and the guard as a whole until one more of the guard members come into engagement with a workpiece or work holder. Beyond this stage, no further lowering motion of the guard member or guard members concerned is possible. However, due to the telescope in action by means of which the guard members are retractable into the sleeves 41 against the resilient force of spring 74, the remainder of the guard continues to move downward with the quill and tool and the machining operation is then carried out. On termination of the machining operation, the quill and tool are raised together and the guard is thus also raised. During the raising operation, the springs 74 return the guard members 16 to their lowermost position so that they continue to provide an effective guard for the tool.

Although a detailed embodiment of the invention has been described in relation to a generally circular guard having two arcuate sections which are coupled together so that both move apart simultaneously to give access to a tool, the invention may in general be applied to other shapes of machine tool guard. For example, a machine tool having four drilling heads in a row, a generally rectangular elongated guard could be provided around the four drilling heads. A corresponding arrangement could of course also be used for other numbers of drilling heads.

Another possibility is to utilize the invention in a single guard curtain to prevent access to a tool or a series of tools from one side only.

In all these various forms of the invention, as well as the form described above in detail, the individual guard members do not project above the support arrangement at any stage during the machining operation and thus guards of this general kind may be used even where there is little clearance above the desired position of the guard.

It should be observed that the thread 60 prevents the catch mechanism from being unlocked by an ordinary bolt. Should an unauthorized person attempt to use a length of plain-screwed rod the plain screw thread would engage both sleeve 61 and plunger 62 and would be unable to retract the plunger 62.

It should also be observed that with the guard in the raised position, the guard members can be adjusted to be just clear of the workpiece, with individual guard members adjusted to different lengths to 'profile' over irregular-shaped workpieces. Also individual guard members can be adjusted to a height which will clear obstructions such as clamps and raised portions of jigs when the guard is opened. Without adjustable stops to the guard members this would be impossible and the guard could jam when opening against an obstruction.

We claim:

1. A machine tool including
    a support arrangement adapted to be mounted on a part of a machine tool which is reciprocable with advance of the tool towards a workpiece,
    a plurality of tubular guide members incorporated in said support arrangement;
    each guide member having a lower portion of reduced internal diameter,
    a plurality of tubular guard members each of a diameter to slide freely within and be guided by said reduced diameter portion of a respective guide member,
    a plurality of adjustable stops each comprising a bushing interposed between one of said guide members and one of said guard members, and secured at an adjustable longitudinal position to one of said members and in sliding and guiding contact with the other of said members, and an abutment on the other of said members for engagement with the bushing to restrict the maximum downward extension of said guide member by interengagement between said bushing and said abutment,
    each of said guard members being slidable between a retracted position where it is retracted into but does not extend above its respective guide member and a lowered position where it extends below said guide member to an extent dependent on the position of the respective adjustable stop means.

2. A machine tool guard according to claim 1 further comprising a plurality of closure members, one for the upper end of each guide member and a like plurality of coil springs, each disposed between a closure member and a guard member to resiliently urge the guard members in a downward direction.

3. A guard according to claim 2, each spring extending from a closure member to the lower end of the tubular guard member and further comprising a plurality of guide rods, one for each spring, extending from a closure member within a spring into a guard member to guide the spring into the guard member during retraction of the guard member.

4. A guard according to claim 1, said bushings each being threaded bushings engaged with mating threads to secure it in an adjustable longitudinal position to said one member.

5. A guard according to claim 4, each of said bushings being an externally threaded bushing engaged with an internal thread on said guide member.

6. A guard according to claim 1, said support arrangement comprising a first pivotal portion and a second pivotal portion, and an operative interconnection between said portions, whereby pivotal movement of one portion away from a guarding position is automatically accompanied by corresponding movement of said other pivotal portion away from its guarding position.

7. A guard according to claim 6, said operative interconnection comprising a toothed gear member on one portion, having teeth meshing with a corresponding toothed gear member on said other portion.

8. A guard according to claim 7, further comprising a catch for closing said portions together and a catch operating member so arranged that the catch can be disengaged and the two portions moved away from their guarding positions in a single movement of the catch operating member.

9. A guard according to claim 8, said catch comprising a removable locking member such that when the locking member is removed, the guard is locked in a closed position.

* * * * *